United States Patent
Zhang

(10) Patent No.: US 10,855,811 B2
(45) Date of Patent: Dec. 1, 2020

(54) NETWORK DEVICE AND INFORMATION PROCESSING METHOD

(71) Applicant: Lenovo (Beijing) Limited, Beijing (CN)

(72) Inventor: Chuanyu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 227 days.

(21) Appl. No.: 15/471,828

(22) Filed: Mar. 28, 2017

(65) Prior Publication Data

US 2017/0279930 A1    Sep. 28, 2017

(30) Foreign Application Priority Data

Mar. 28, 2016    (CN) .......................... 2016 1 0183037

(51) Int. Cl.
*H04L 29/06* (2006.01)
*H04L 29/08* (2006.01)

(52) U.S. Cl.
CPC ............ *H04L 67/42* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 10,075,334 B1 * | 9/2018 | Kozura | ............... | H04L 41/0806 |
| 10,359,791 B2 * | 7/2019 | Trivedi | ................... | F24F 11/62 |
| 2005/0043026 A1 * | 2/2005 | Brok | ..................... | H04W 48/18 |
| | | | | 455/434 |
| 2014/0033057 A1 | 1/2014 | Zhang | | |
| 2014/0211434 A1 * | 7/2014 | Fry | ..................... | H01R 13/665 |
| | | | | 361/760 |
| 2015/0097958 A1 * | 4/2015 | Fadell | ................... | G05B 15/02 |
| | | | | 348/152 |
| 2015/0188855 A1 | 7/2015 | Liu et al. | | |
| 2017/0111423 A1 * | 4/2017 | Cui | ...................... | H04L 65/608 |

FOREIGN PATENT DOCUMENTS

| | | |
|---|---|---|
| CN | 101826995 A | 9/2010 |
| CN | 102882775 A | 1/2013 |
| CN | 102945029 A | 2/2013 |
| CN | 103338565 A | 10/2013 |
| CN | 1033540006 A | 10/2013 |
| CN | 103623450 A | 3/2014 |
| CN | 103997442 A | 8/2014 |

\* cited by examiner

*Primary Examiner* — Angela Nguyen

(74) *Attorney, Agent, or Firm* — Kunzler Bean & Adamson

(57) ABSTRACT

For information processing, a network device includes a first communication component that is connected with a server via a first type of access network, and performs an information interaction with the server. The network device further includes a second communication component that is connected to the first communication component. The second communication component connects with at least one terminal device and performs an information interaction with the at least one terminal device by sending information based on an information interaction with the server.

20 Claims, 5 Drawing Sheets

NETWORK DEVICE AND INFORMATION PROCESSING METHOD

FIELD

The present invention relates to the field of information technologies, and in particular relates to a network device and an information processing method.

BACKGROUND

With the development of information technology and electronic technology, the application of a terminal device is becoming increasingly widespread, and various types of terminal devices have appeared, for example, smart home appliances. Smart home appliances may comprise a smart television, a smart air conditioner and the like, and further comprise smart devices such as a smart window, a smart door lock and the like. A method for controlling these terminal devices may employ mono-control, that is, a television remote control is utilized to control a smart television, and an air conditioner remote control is utilized to intelligently control an air conditioner. However, a plurality of terminal devices may be controlled by using one control device, such that the control of the terminal devices is more simple and convenient and an operating state of the terminal device better meets current requirements.

SUMMARY

A network device for information processing is disclosed. The network device includes a first communication component that is connected with a server via a first type of access network, and performs an information interaction with the server. The network device further includes a second communication component that is connected to the first communication component. The second communication component connects with at least one terminal device and performs an information interaction with the at least one terminal device by sending information based on an information interaction with the server.

A method for information processing is disclosed. The method establishes a connection with a server via a first type of access network. The method further performs performing an information interaction with the server. In addition, the method performs an information interaction with at least one terminal device by sending information based on the information interaction with the server.

A program product for information processing is disclosed. The program product includes a non-transitory computer readable storage medium that stores code executable by a processor to establish a connection with a server via a first type of access network. The processor further performs an information interaction with the server. In addition, the processor performs an information interaction with at least one terminal device by sending information based on the information interaction with the server.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

The technical solutions of the present invention are further described below with reference to accompanying drawings and specific embodiments of the specification.

Embodiment 1

Figure 1:
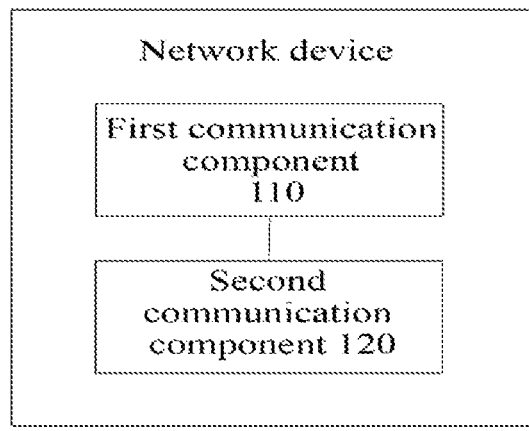
FIG. 1 is a schematic structural diagram of a network device provided in an embodiment of the present invention.

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

The first communication component 110 may comprise a wireless or a wired interface, capable of establishing a connection with a server via a first type of access network. The server herein may be an electronic device located on a network side. The first type of access network may be various types of access networks, a connection to the Internet is made via a first type of access network formed by transmission media such as fiber optic or cables and the like, and then a connection to the server is made through a transmission link in the Internet and a communication device.

The second communication component 120 may comprise a communication interface capable of being at least connected to one terminal device. The communication interface described in this embodiment may be selected as a wireless interface, in particular, such as a WiFi interface or a Bluetooth interface. Typically, the wireless interface corresponding to the second communication component 120 may be a short-range communication interface, and the short-range communication interface provided in this embodiment may be a communication interface for which the communication distance is less than 150 or 100 meters. The terminal device may be various smart devices, such as smart home and the like. The terminal device is typically a local device of the network device described in this embodiment. The server is a remote device of the network device relative to the network device. In general, a connection between the terminal device and the network device may be established via a direct connection link, and the direct connection link herein may be a link without other intermediate devices between the terminal device and the network device. However, the link established between the network device and the server is an indirect connection link. Of course, the number of the terminal devices with which the second communication component 120 is capable of being connected may be two or more, and at this time, the network device described in this embodiment may act as a centralized-control device of the two or more terminal devices. In this embodiment, the second communication component 120 may act as an intermediate node through which the terminal device performs an information interaction with other electronic devices. The second communication component 120 is capable of converting information sent to the terminal device by other electronic devices into information capable of being identified by the terminal device according to a communication protocol, and then sending the information to the terminal device; to convert information sent by the terminal device into information capable of being identified by other electronic devices according to a communication protocol, and then convert the information to other electronic devices. Other electronic devices herein may comprise the above-described server, and may further comprise other electronic devices directly connected on the network device. For example, the terminal device is directly controlled by a mobile phone or a tablet or a wearable device connected to the second communication component 120 and the like. In summary, the network device described in this embodiment may act as an intermediate device through which the terminal device performs an information interaction with other electronic devices, so as to avoid a phenomenon that a plurality of communication protocols is stored and loaded since other electronic devices must load the communication protocol through which the devices are capable of communicating with each terminal device, and the like. The network device in this embodiment is employed to connect with the terminal device. In this manner, the terminal device is connected to the network device, and the network device may store and load communication protocols through which the network device communicates with these terminal devices. In this manner, any one of other electronic devices may perform an information interaction with the terminal devices through the network device without loading respective communication protocols, thereby improving simplicity of interaction with the terminal devices.

Of course, the link established between the terminal device and the network device may also be an indirect connection link, but in general, a geographical distance between the network device and the terminal device is less than a designated distance, for example, less than 100 or 50 meters.

The network device may be a gateway. The gateway is also referred to as a connector between networks, and a protocol converter. The gateway achieves network interconnection above a network layer, and may be used for both wide area network interconnection and local area network interconnection. The gateway is a computer system or device which undertakes an important task of conversion. The gateway is a translator when used in two systems with different communication protocols, data formats or languages, or even with completely different architectures. Unlike the case where a network bridge only conveys information in a simple manner, the gateway repacks the received information to accommodate the requirements of a teleological system. A common gateway device may comprise a device such as a router, a switch, a hub and the like. Generally, the gateway will participate in data forwarding and protocol converting between different devices. In this embodiment, the terminal device is capable of being connected to a network utilizing the network device provided in this embodiment, and the network herein may comprise a local area network and the Internet. In this embodiment, the Internet may broadly refer to other networks than the local area network in which the terminal device is located.

Figure 2:
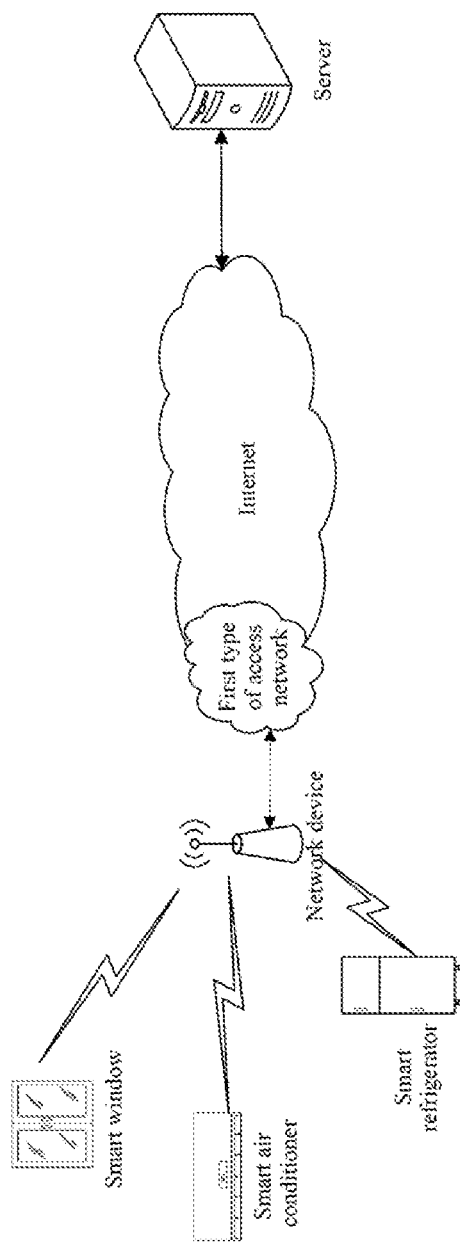
FIG. 2 is a schematic diagram of a connection of a network device with a server and a terminal device provided in an embodiment of the present invention.

FIG. 2 is a schematic diagram of connection of a network device with a server and a terminal device provided in an embodiment of the present invention; the network device is connected to the Internet utilizing the first communication component 110 via the first type of access network, and connected to the server via the Internet; meanwhile, the network device is further capable of establishing a connection and performing an information interaction with the terminal device utilizing the second communication component 120. The terminal device shown in FIG. 2 comprises a smart air conditioner, a smart refrigerator and a smart window, and is not limited to the terminal device shown in FIG. 2 when being practically implemented.

In summary, the embodiment provides a network device which is capable of succinctly achieving an information interaction between an electronic device such as a server and a terminal device, so as to succinctly and more efficiently control the running of the terminal device.

Embodiment 2

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

Figure 3:
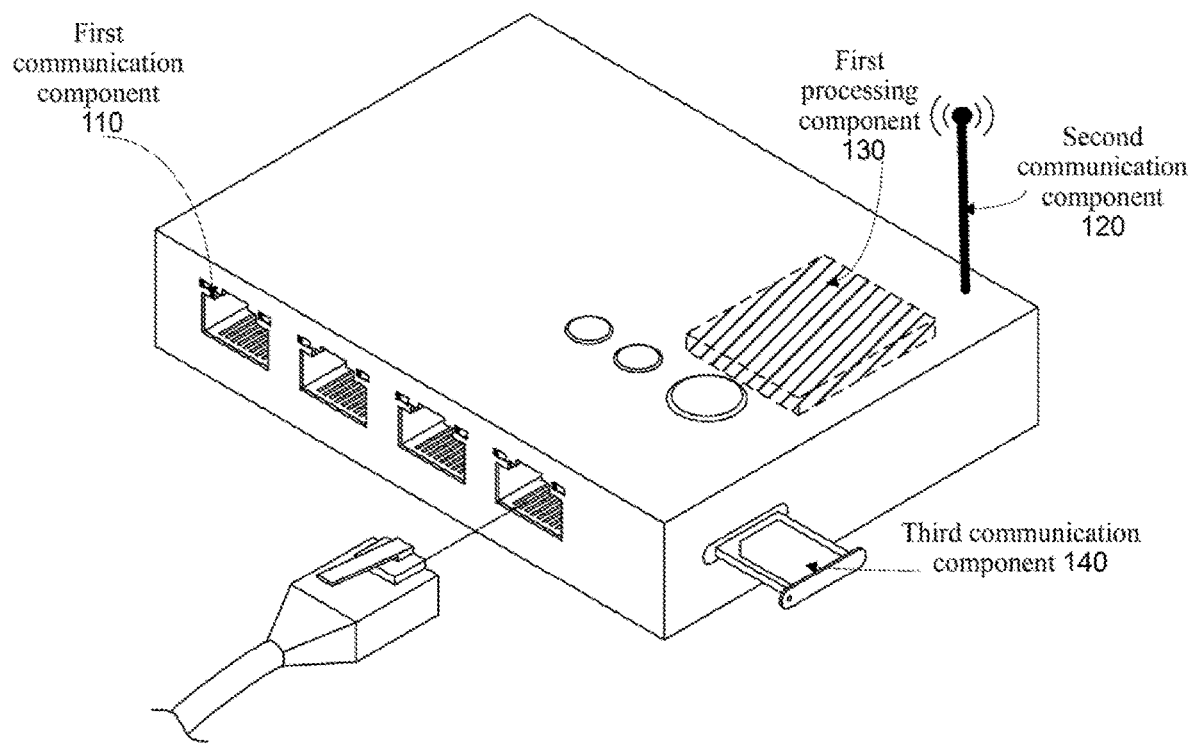
FIG. 3 is a perspective drawing of another network device provided in an embodiment of the present invention.

As shown in FIG. 3, the network device further comprises:

a first processing component 130, connected to the first and second communication components 110, 120 respectively, capable of judging whether the connection established by the first communication component 110 via the first type of access network is disconnected;

a third communication component 140, connected to the first processing component, capable of establishing a connection and performing an information interaction with the server via a second type of access network if the connection established via the first type of access network is disconnected, wherein the first type of access network and the second type of access network are different types of access networks, and the third communication component and the first communication component are different types of communication components.

The first processing component 130 described in this embodiment may be various processing circuits or processors or processing chips having information processing in the network device. The processing circuit may be an application specific integrated circuit, and the processor may be a central processor, a microprocessor, a digital signal processor, an application processor, or a programmable array and the like. The processing chip may comprise a South bridge processing chip or a North bridge processing chip and the like. In summary, the processing component 130 is connected to the first and second communication components 110, 120, capable of judging whether the connection established by the first communication component 110 via the first type of access network is disconnected, and in particular to determine whether the connection established by the first communication component 110 via the first type of access network is disconnected according to the current operating state of the first communication component 110. As an example, it is assumed that the first communication component 110 establishes a long connection with the server via the first type of access network, then a heartbeat message will be received within each predetermined time; if the first processing component 130 finds that the heartbeat message is not received for more than the predetermined time, it can be considered that the connection between the first communication component 110 and the server is disconnected. As another example, the first processing component 130 may be further used to form a detection data packet, the detection data packet is sent to the server or the network by the first communication component 110, and a returned feedback data packet is received by the first communication component 110; if the feedback data packet is not received within a designated time, it can be considered that the connection established between the first communication component 110 and the server via the first type of access network is disconnected. Of course, there are many methods for the first processing component 130 to judge whether the connection established between the first communication component 110 and the server via the first type of access network is disconnected, therefore they are not listed in detail herein.

It should be noted that in FIG. 3, the first processing component 130 is a structure located inside the network device, and is represented by a dashed line in FIG. 3. A third communication component 140 shown in FIG. 3 is in an interior of a housing of the network device when in an applied state, and FIG. 3 shows an exploded schematic view of the third communication component 140 pushed out from the interior of the network device to be revealed. In FIG. 3, there is also a transmission link of the first type of the access network connected to the first communication component 110.

In this embodiment, the first type of access network may be a network part for connection of various electronic devices to the Internet, and the network part may typically comprise a transmission link and an access device. In this embodiment, the first type of access network may comprise a wired transmission link and a wired access device. The wired transmission link herein may comprise a cable transmission link and an optical cable transmission link.

The third communication component 140 is further introduced in this embodiment. The third communication component 140 described in this embodiment is a communication component of a type different from the first communication component 110. The third communication component 140 may be a wireless transmission communication component 140. The second type of access network may be a wireless access network. The wireless access network may comprise a wireless access device. The wireless access device herein may comprise various base stations, for example, an evolved base station eNB.

In this embodiment, the first type of access network and the second type of access network are different types of access networks, and in this embodiment, limiting the first type of access network as a wired access network, and limiting the second type of access network as a wireless access network are only an example, while the implementation is not limited thereto.

Of course, the first type of access network and the second type of access network may be networks which employ different communication protocols to perform a network access. For example, the first type of access network may be a network part which employs a WiFi communication protocol. The second type of access network may a network part which employs a mobile data communication protocol. The mobile data communication protocol herein typically has the 3rd Generation Partnership Project (3GPP) R13, 3GPP R14, or 3GPP R15. In this embodiment, the first type of access network and the second type of access network are different types of access networks.

In this embodiment, the first communication component 110 and the third communication component 140 can be backup communication components to each other. In this embodiment, the third communication component 140 is capable of establishing a connection with the server via the second type of access network when the connection established with the server by the first communication component 110 via the first type of access network is disconnected, such that the network device can keep connection and then perform an information interaction with the server via the second type of access network, so as avoid the problem of impossible communication caused by the disconnection between the network device and the server due to the disconnection of the first type of access network corresponding to the first communication component 110, thereby facilitating a better remote control of the server to the running of the terminal device by the network device, or obtaining of a running state of the terminal device in a more timely manner.

Figure 4:
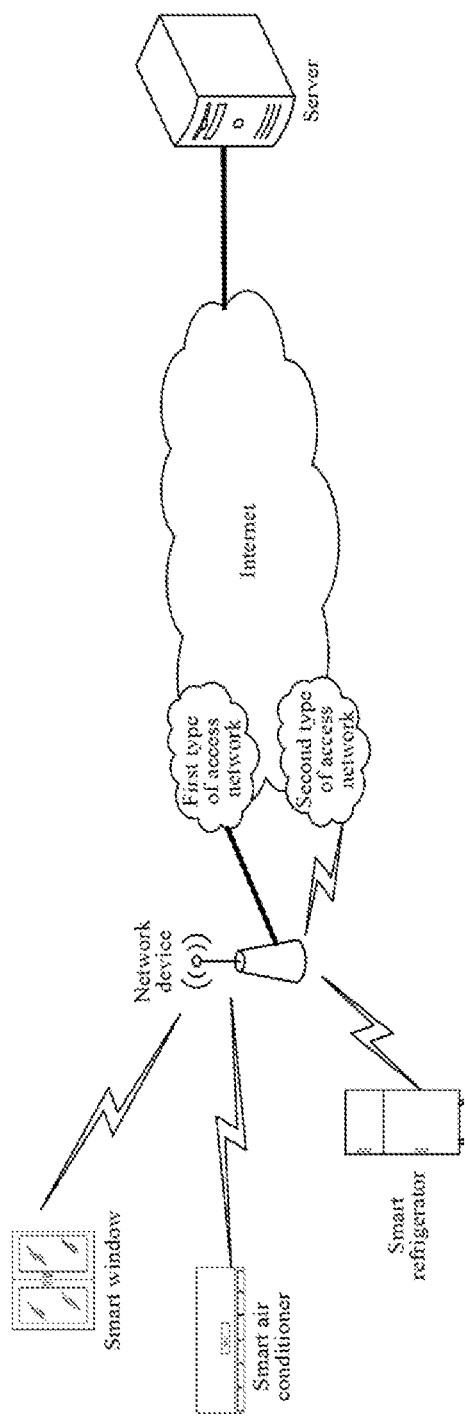
FIG. 4 is a schematic diagram of a connection of a network device with a server and a terminal device provided in an embodiment of the present invention.

FIG. 4 shows a schematic diagram of connection of the network device with the server and the terminal device respectively provided by the embodiment; as known from FIG. 4, the network device is capable of being connected to the Internet via the first type of access network and the second type of access network respectively, and finally connecting to the server.

Embodiment 3

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

As shown in FIG. 3, the network device further comprises:

a first processing component 130, connected to the first and second communication components 110, 120 respectively, capable of judging whether the connection established by the first communication component 110 via the first type of access network is disconnected;

a third communication component 140, connected to the first processing component, capable of establishing a connection and performing an information interaction with the server via a second type of access network if the connection established via the first type of access network is disconnected, wherein the first type of access network and the second type of access network are different types of access networks, and the third communication component and the first communication component are different types of communication components.

The first processing component 130 is further capable of determining a first operating strategy according to connection state information of the first communication component 110 and third communication component 140 with the server; and selecting a communication component to perform an information interaction with the server based on the first operating strategy, and/or controlling interaction parameters of the communication component performing an information interaction with the server.

In this embodiment, the first processing component 130 not only can detect a state of connection between the first communication component 110 and the server, but can also detect a state of connection between the third communication component 140 and the server; and is capable of determining a corresponding operating strategy according to the connection state information corresponding to the above-described connection state. In this embodiment, the operating strategy is referred to as a first operating strategy.

The first processing component 130 may specifically be used to select the first communication component 110 to perform information communication with the server if the first communication component 110 is in a connected state with the server, and/or to control interaction parameters of the first communication component 140 performing an information interaction with the server. The interaction parameters herein may comprise interaction frequency information and interaction permission parameters.

The first processing component 130 may specifically be used to select the third communication component 140 to perform information communication with the server when the first communication component 110 is in a disconnected state with the server, and/or to control interaction parameters of the third communication component 140 performing an information interaction with the server. The interaction parameters herein may comprise interaction frequencies and interaction permissions.

Typically, in this embodiment, the first communication component 110 and the third communication component 140 establish connections with the server employing different types of access networks, both of which are capable of performing an information interaction with the server. In this embodiment, typically the first communication component 110 may be selected as a default communication component, and the first processing component 130 selects the first communication component 110 to perform an information interaction with the server as long as it detects that the first communication component 110 runs normally and is capable of establishing a connection with the server normally. That is, a communication priority of the first communication component 110 is higher than that of the third communication component 140. In general, the reason why the priority of the first communication component 110 is higher than that of the third communication component 140 may be that the tariff for the communication of the first communication component 110 is lower than that for the communication of the third communication component 140.

In this embodiment, the third communication component 140 may be a mobile data communication component, and the communication protocol employed by the mobile data communication component herein may be a mobile data communication protocol, for example, such as the above-described 3GPP R13, 3GPP R14 and the like.

In general, the first processing component 130 may specifically be used to employ a first interaction frequency and/or a first interaction permission to control an information interaction between the first communication component 110 and the server if the first communication component 110 is selected to perform an information interaction with the server, and to employ a second interaction frequency and/or a second interaction permission to control an information interaction between the third communication component 140 and the server if the third communication component 140 is selected to perform an information interaction with the server. Typically, the first interaction frequency is higher than the second interaction frequency, and the first interaction permission is greater than the second interaction permission. For example, not only instructions and parameters for controlling the terminal device, but also information on a running state of the terminal device may be interacted between the network device and the server. Furthermore, executable code of the network device and a version of the loaded communication protocol and the like may also be updated. For example, the second interaction permission may not comprise code updating permissions, communication protocol updating permissions and the like. The frequency at which the first communication component 110 reports the running state of the terminal device to the server may be higher than the frequency at which the third communication component 140 reports the running state of the terminal device to the server.

In summary, in this embodiment, the first processing component 130 will select a suitable first operating strategy according to information of a state of connection of the first and third communication components 110, 140 with the server, utilize the first operating strategy to select the communication component to communicate with the server, and control interaction parameters of the selected communication component to better control the operation of the network device.

Embodiment 4

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

The first communication component 110 is a mobile data communication component, capable of establishing a connection and performing an information interaction with the server via a mobile data access network.

In this embodiment, the first communication component 110 is a mobile data communication component, and the mobile data communication component may be a component capable of running the mobile data communication protocol, such as the above-described 3GPP R13 or 3GPP R15 and the like. In this embodiment, the mobile data communication component may comprise a subscriber identity module (SIM) or a universal subscriber identity module (USIM). The mobile data communication component may be a third generation (3G) mobile data communication component, a fourth generation (4G) mobile data communication component or a fifth generation (5G) mobile data communication component.

The mobile communication data communication component, due to high stability thereof, is capable of better keeping the connection between the network device and the server clear relative to other types of communication components employed, so as to avoid the problem of impossible communication resulted from the disconnection between the network device and the terminal device.

Embodiment 5

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

Figure 5:
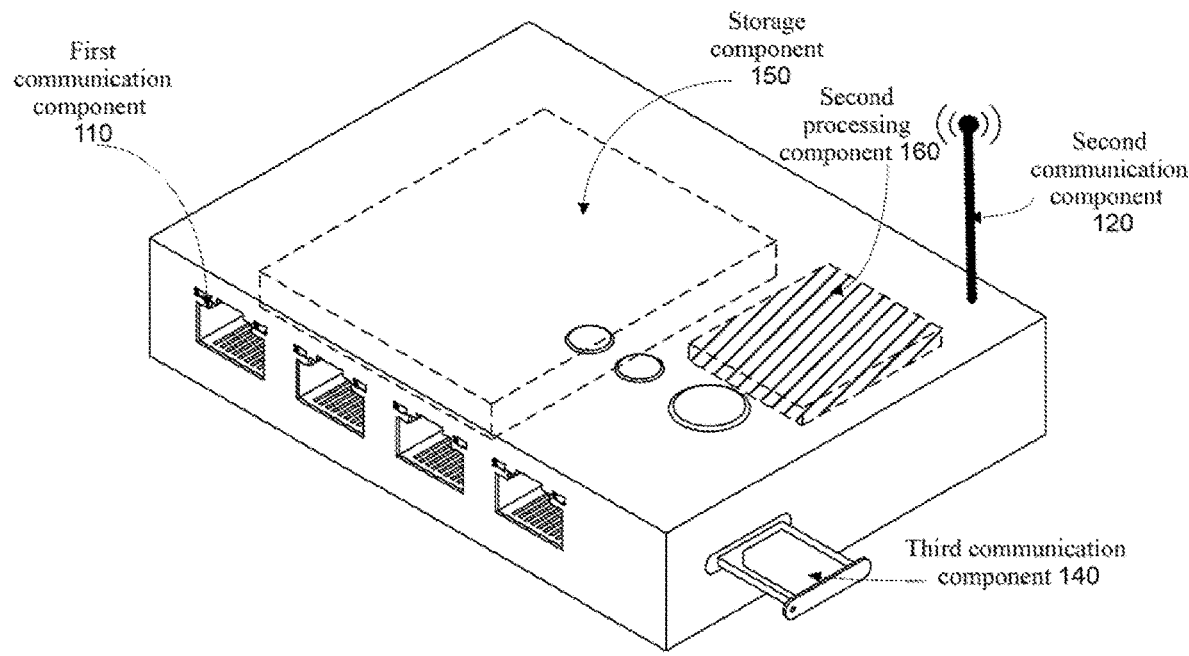
FIG. 5 is a perspective drawing of another network device provided in an embodiment of the present invention.

As shown in FIG. 5, the network device further comprises a storage component 150 and a second processing component 160;

the storage component 150 is capable of storing first control-associated information locally, wherein the first control-associated information comprises a correspondence relationship between first event information and second event information;

the second communication component 120 is capable of receiving first event information sent by a first terminal device;

the second processing component 160, connected to the storage component, is capable of generating a first control instruction according to the first event information, and generating a second control instruction according to the first control-associated information and the first event information; it should be noted that the second processing component 160 in this embodiment may be the same processor or processing circuit corresponding to the first processing component in Embodiment 2, and may be a different processor or processing circuit corresponding to the first processing component in Embodiment 2.

The second communication component 120 is specifically used to send the first control instruction to the first terminal device, and send the second control instruction to a second terminal device.

The network device described in this embodiment is a further improvement on the basis of the embodiment of any one of the above-described network devices, and may be combined with any one of the technical solutions in the above-described embodiments without conflict. For example, the network device in this embodiment may also comprise the second processing component 160 and the third communication component 140.

In this embodiment, the storage component 150 may correspond to various storage media, preferably non-transitory storage media. The storage component 150 may not locally store the first control-associated information. In this embodiment, both the first event information and the second event information are instructions which trigger the terminal device to complete corresponding operations. For example, a detection of event information on an indoor temperature increase will trigger an air conditioner to perform a cooling operation; meanwhile, the event information on the indoor temperature increase is the second event information which will trigger a smart window to be closed.

In this embodiment, the first control-associated information may be associated information that the network device controls different smart devices to perform a link operation.

For example, the terminal device comprises both a smart window and a smart air purifier. The smart window detects that a value of concentration of suspended particles in outdoor air is greater than a predetermined standard, and that the value of suspended particles in outdoor air is greater than the predetermined standard may be the first event information. The event information that the value of concentration of suspended particles in outdoor air has a correspondence with information that a value of concentration of indoor suspended particles is greater than the predetermined standard. The second processing component 160 may be used to generate the first control instruction if the value of concentration of suspended particles in outdoor air is greater than the predetermined standard, and may be further used to generate the second control instruction if the value of concentration of suspended particles in indoor air is greater than the predetermined standard. A specific structure of the second processing component 160 in this embodiment may refer to the second processing component 160 in the above-described embodiments, therefore it will not be repeated in this embodiment.

The second communication component 120 may be specifically used to send the first control instruction and the second control instruction to the first terminal device and a second terminal device.

In this embodiment, the storage component 150 is utilized to store the first control-associated information locally to the network device, in this way, even if an information interaction with the server does not occur, the associated control of different terminal device may be achieved, and in this way, when the first communication component 110 or the first communication component 110 and the third communication 140 malfunction in the network device, the associated control of different terminal device may still be achieved.

In order to make the first control-associated information stored in the storage component 150 more complete to accurately control the terminal device, in this embodiment, the first communication component 110 is further capable of receiving updated information from the server when establishment of the connection with server succeeds; the updated information may be used to update the first control-associated information in the first storage component 150.

As a further improvement of this embodiment, the network device further comprises:

the second processing component 160, connected to the first and second communication components 110 and 120 respectively, is capable of determining a second operating strategy according to connection state information between the first communication component and the server; and generating a control instruction for controlling the terminal device according to the second operating strategy.

The second processing component 160 is connected to the first communication component 110 and the second communication 120 respectively, and is capable of determining the operating strategy according to information on a state of connection between the first communication component 110 and the server. In this embodiment, the strategy is referred to as the second operating strategy. A control instruction for controlling the terminal is generated according to the second operating strategy. For example, the storage component 150 locally stores the first control-associated information, the server also stores control-associated information, and whether the running of the terminal device is controlled specifically according to the control-associated information in the server or according to the first control-associated information stored locally may be determined by the second operating strategy determined by the second processing component 160. In particular, for example, the second processing component 160 is specifically used to control the first communication component 110 to receive second control-associated information from the server if establishing a connection between the first communication component 110 and the server succeeds, and to generate a control instruction sent to the terminal device according to the second control-associated information; and read the first control-associated information from the storage component if establishing a connection between the first communication component 110 and the server fails, and generate a control instruction sent to the terminal device according to the first control-associated information.

Since the second control-associated information stored in the server may be the latest version of the control-associated information, and may also be a more complete version of control-associated information, in order to achieve an accurate control, in this embodiment, if the second processing component 160 determines that the establishment of the connection between the first communication component 110 and the server succeeds, the second control-associated information may be read from the server to control the running of the terminal device; and if the connection between the first communication component 110 and the server is disconnected, at which time the running of the terminal device is still required to be better controlled, the first control-associated information stored locally may be selected for processing. This not only may achieve the associated control, but may also ensure accuracy of the control.

As an improvement in another aspect of this embodiment, the storage component 150 is further capable of storing control reference information; the second processing component 160 is further capable of generating a third control instruction according to the control reference information of a specified type, and controlling the second communication unit to send the third control instruction to the terminal device, wherein the control reference information of the specified type comprises information that a rate of change of the control reference information is less than a specified threshold.

In this embodiment, the control reference information is stored, and the control reference information herein may be reference information which triggers the second processing component 160 to generate a corresponding control instruction to control the terminal device to change the running state.

In this embodiment, the control reference information may be various parameters such as temperature, humidity, concentration values of air suspension, brightness values and the like. In this embodiment, the designated type of control reference information is information the rate of change of which is lower than a designated threshold. In this embodiment, the rate of change may be an average rate of change. For example, air temperature. For example, the current date is Mar. 1, 2016, and the storage component 150 stores air temperature of Feb. 29, 2016. In order to prevent indoor temperature from being too low, typically the window is required to be closed to reduce heat exchange between indoor and outdoor air. In this embodiment, if the connection between the current network device and the server is disconnected, the network device cannot obtain air temperature on the current date, at this time, the second processing component 160 of the network device provided in this embodiment will generate a corresponding control instruction according to the air temperature of February 29, and send the third control instruction to the smart window to control opening and closing of the smart window. It should be noted that in this embodiment, the storage component 150 is mainly used to store history control reference information, and in this way, it is convenient for the second processing component 160, when failed to obtain the control reference information on the current date, to generate the third control instruction according to a designated type of history control reference information.

In summary, the network device described in this embodiment introduces the storage component 150, and the storage component 150 may be used to control the associated information and/or control the reference information and the like, so it is convenient for the processing component 130 to generate a corresponding control instruction directly according to data stored in the storage component 150, so as to control the running of the terminal device.

Embodiment 6

As shown in FIG. 1, this embodiment provides a network device, comprising:

a first communication component 110, capable of establishing a connection with a server via a first type of access network, and performing an information interaction with the server;

a second communication component 120, connected to the first communication component, capable of connecting with at least one terminal device, and performing an information interaction with at least one terminal device sending information based on an interaction with the server.

The information interacted between the network device and the server at least comprises at least one of the following:

sending third event information to the server, and receiving fourth event information associated with the third event information returned by the server;

receiving fifth event information generated by the server based on first information sent by a control device; and sending to the server sixth event information generated based on feedback information of the terminal device.

In this embodiment, the third event information may be sent to the server, and the third event information herein may be information received from a sensing device by the network device, and may also be event information that the terminal device reports the event information. For example, temperature information reported by a thermometer, humidity information detected by a hygrometer, and indoor illumination information detected by the network device itself are received. The network device sends the third event information, and receives the third event information returned by the server. For example, the network device reports an indoor temperature to the server, and the server finds that the indoor temperature is too high, so it is required to trigger an air conditioner to start running; however, starting to run the air conditioner is the fourth event information triggered by the indoor temperature which is the third event information. The network device may generate an instruction for controlling the window to close after receiving the fourth event.

The fifth event information generated based on first information sent by the control device is received by the server. The control device in this embodiment may be a remote-control device, for example, a mobile terminal device such as a mobile phone or a tablet and the like, and the control device does not directly establish a connection with the network device, but establishes a connection with the server, so the control device sends the first information to the server, and the server generates the fifth event information after receiving the first information. The fifth event information may be used for the network device to generate a corresponding control instruction to control the terminal device to perform a corresponding operation. For example, the user who is working at the office currently remembers that the desktop at home is in a powered-on state, and a connection with the network device is not capable of being established directly; in this embodiment, the mobile phone sends control information on turning off of the desktop to the server by establishing a connection with the server, the server will send the fifth event information to the network device after receiving the control information, and in this way, the network device generates a corresponding instruction for controlling the desktop to be turned off after receiving the fifth event information.

In this embodiment, the network device will also generate the sixth event information based on the feedback information reported by the terminal device, and send it to the server. For example, the air conditioner reports current indoor temperature and target temperature information and the like during running, and the server generates or directly considers the feedback information sent by the air conditioner as the sixth event information to be sent to the server, which is convenient for the server to remotely monitor the running of the terminal device. Of course, the server may also send related information to the control device by the connection with the control device after receiving a variety of information reported by the network device, which is convenient for the user to directly and remotely monitor the running of the terminal device.

Embodiment 7

Figure 6:
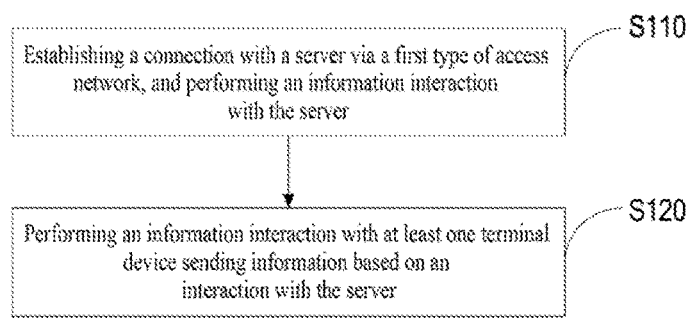
FIG. 6 is a schematic flow diagram of an information processing method provided in an embodiment of the present invention.

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

The information processing method described in this embodiment may be the method running in the network device in the above-described embodiments. At step S110, the connection with the server may be established via the first type of access network, and an information interaction is performed with the server. At step S120, an information interaction is performed with the terminal device according to information of the interaction with the server. In this embodiment, the terminal device may be various smart home as recorded in the above-described embodiments, and may also be the terminal device such as a notebook or a desktop which is capable of being connected to the network device and the like.

The related description of the first type of access network may also refer to the above-described embodiments.

During the implementation, the step S120 may comprise converting information which is sent to the network device by the server employing a first communication protocol into information sent by employing a second communication protocol, so as to be sent to the terminal device, and/or converting data sent by the terminal device employing the second communication protocol into data sent by employing the first communication protocol, so as to be sent to the server. The network server is capable of playing a transit function through steps S110 and S120. In this embodiment, at step S120, it is possible to perform data interaction with two or more terminal devices.

During the implementation, at step S120, the case where the network device performs an information interaction based on information of the interaction with the server may comprise the case where the network device transmits a control instruction to the terminal device, and may also comprise the case where the network device generates a control instruction after receiving the information sent by the server, and then sends the generated control instruction to the terminal device to achieve a remote control of the server to the running of the terminal device. Of course, the information interacted between the network device and the server in this embodiment may refer to Embodiment 6, therefore it will not be repeated in this embodiment.

Notably, the information processing method described in this embodiment may be a method running in the gateway, the terminal device may be a smart device, and the gateway can act as a local control device of the terminal device to receive the control of other electronic devices by executing the above-described method, for example, receiving the remote control of the server, or the control of the electronic device such as a mobile phone and a tablet and the like through the gateway.

Embodiment 8

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

the method further comprises:

judging whether the connection established via the first type of access network is disconnected;

establishing a connection and performing an information interaction with the server via a second type of access network if the connection established via the first type of access network is disconnected, wherein the first type of access network and the second type of access network are different types of access networks.

In this embodiment, the method further comprises judging whether the connection established via the first type of access network is disconnected, in particular whether the connection established with the server via the first type of access network is disconnected; and if it is disconnected in this embodiment, establishing a connection and performing an information interaction with the server via the second type of access network. The related description of the first type of access network and the second type of access network may refer to the above-described embodiments, therefore they will not be repeated herein. In summary, in this embodiment, if the connection with the server is disconnected, the connection is established with the server via another access network instead, and information interaction is performed to keep a clear connection and stable information interaction with the server, so as to better control the running of the terminal device or to facilitate the server to obtain information on a running state of the terminal device in a more timely manner.

Embodiment 9

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

the method further comprises:

determining a first operating strategy according to connection state information of the first type of access network and the second type of access network with the server;

selecting the type of access network to perform an information interaction with the server based on the first operating strategy, and/or controlling interaction parameters performing an information interaction with the server.

In this embodiment, the method further comprises determining the first operating strategy according to connection state information on the connection established with the server via different types of access networks.

In this embodiment, typically if the connection with the server via the first type of access network is normal, an operating strategy selecting the first type of access network to make a connection with the server to perform an information interaction is generated; if the connection with the server via the first type of access network is abnormal, and the connection with the server via the second type of access network is normal, an operating strategy selecting the second type of access network to make a connection with the server to perform an information interaction is generated.

The first operating strategy is not limited to selecting selection parameters for connection with the server, and may further comprise controlling interaction parameters for performing an information interaction with the server via different types of access networks. The interaction parameters herein may comprise various parameters such as interaction frequencies and interaction permissions and the like, and definitions and functions of these parameters may refer to the above-described corresponding embodiments, and will not be repeated herein.

Embodiment 10

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

The step S110 may comprise establishing a connection and performing an information interaction with the server via a mobile data access network.

In this embodiment, the first type of access network may be a mobile data access network, and typically the mobile data access network comprises a cellular access network. In this embodiment, establishing a connection with the server via the mobile data access network may comprise establishing the connection with the server via an access device of the mobile data access network, such as a base station. In this embodiment, the base station may be an evolved base station. In this embodiment, establishing the connection and performing information interaction with the server via the mobile data access network may comprise accessing the network via an access device of the mobile data access network by employing a mobile data communication protocol and finally establishing a connection with the server. The mobile data communication protocol herein may comprise the above-described 3GPP R13, 3GPP R14 and 3GPP R15 and the like.

The information processing method described in this embodiment may be the information processing method running in the network device provided in the above-described embodiments. When the network device is a gateway device, the gateway is capable of accessing the network via the mobile data access network by running the above-described method, and finally establishing a connection with the server via other networks, which is capable of achieving a continuous control of the terminal device based on stability of the mobile data access network.

Embodiment 11

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

the method further comprises:

storing first control-associated information locally;

receiving first event information sent by a first terminal, wherein the first control-associated information comprises a correspondence relationship between the first event information and second event information;

if the connection established via the first type of access network is disconnected, generating a first control instruction according to the first event information, and generating a second control instruction according to the first control-associated information and the first event information;

sending the first control instruction to the first terminal device, and sending the second control instruction to a second terminal device.

In this embodiment, the network device will locally store the first control-associated information, and receive the first event information sent by the first terminal device.

If the connection established via the first type of access network is disconnected, generating a first control instruction according to the first event information, and generating a second control instruction, that should be triggered and formed by the second event, according to the first control-associated information and the first event information; finally, the first control instruction is sent to the first terminal device, and the second control instruction is sent to the second terminal device, and in this way, the network device will generate two control instructions to control two terminal devices to perform corresponding operations respectively when only the first event information is received. In this embodiment, the first terminal device and the second terminal device are different terminal devices.

In summary, the first control-associated information is locally stored in this embodiment, and is capable of achieving an associated control of two different terminal devices, and the detailed description of the associated control may refer to corresponding portions of the above-described embodiments. By locally storing the first control-associated information, the associated control may still be achieved by utilizing the first control information stored locally even when the connection with the first server is disconnected, thereby improving the control effect and stability of the control effect.

As a further improvement of this embodiment, the method further comprises:

determining a second operating strategy according to connection state information, wherein the connection state information is state information on a connection established with the server via the first type of access network;

generating a control instruction for controlling the terminal device according to the second operating strategy.

In this embodiment, the method further comprises determining the second operating strategy according to connection state information. In this embodiment, the second operating strategy is used to control rule information of the network device for running the information processing method provided in this embodiment, and the like.

In this embodiment, the second operating strategy will also be determined according to connection state information. The connection state information herein characterizes information on a state of connection established with the server via the first type of access network, and a control instruction for controlling the smart device is generated according to the second operating strategy. In this embodiment, the second operating strategy may be used to determine a reference basis for generating the control instruction.

Specifically, generating a control instruction for controlling the terminal device according to the second operating strategy comprises at least one of the following:

if establishing a connection with the server via the first type of access network fails, generating a control instruction sent to the terminal device according to the first control-associated information;

if establishing a connection with the server via the first type of access network succeeds, receiving second control-associated information from the server, and generating a control instruction sent to the terminal device according to the second control-associated information.

In this embodiment, if the network device determines that the establishment of the connection with the server via the first type of access network fails when the network device operates according to the second operating strategy, the phenomenon that communication cannot be performed with the server via the first type of access network due to the fact that the establishment of the connection with the server via the first type of access network does not succeed or the connection established is disconnected and the like is included. In this embodiment, the network device will generate the first and second control instructions according to the locally stored first control-associated information. If establishing a connection with the server via the first type of access network succeeds, it indicates that the network device may communicate with the server via the first type of access network, and the network device will receive the second control-associated information from the server and generates the control instruction according to the second control-associated information, thereby controlling the terminal device according to the second control-associated information. During the implementation, the update time for the stored second control-associated information is later than that for the first control-associated information, so that the accuracy is higher when the second control-associated information is used to control the terminal device.

During the implementation, the method further comprises:

when the establishment of the connection with the server via the first type of access network succeeds, updating information from the server; and utilizing the updated information to update the locally stored first control-associated information.

Embodiment 12

As illustrated in FIG. 6, this embodiment provides an information processing method, comprising:

step S110 establishing a connection with a server via a first type of access network, and performing an information interaction with the server;

step S120 performing an information interaction with at least one terminal device sending information based on an interaction with the server.

the method further comprises:

storing control reference information locally;

generating a third control construction according to the control reference information of a specified type, and sending the third control instruction to the terminal device, wherein the control reference information of the specified type comprises information that a rate of change of the control reference information is less than a specified threshold.

In this embodiment, the method further comprises locally storing the control reference information, and the control reference information stored in this embodiment comprises history control reference information at history time in addition to the control reference information on the current date. In this embodiment, the third control instruction is generated according to the control reference information, and the third control instruction is sent to the terminal device, and in this way, even if the connection between the network device and the server is in a disconnected state, the running of the terminal device is capable of being controlled according to the history control reference information stored locally. Of course, in order to achieve an accurate control, the designated type of control reference information in this embodiment comprises information that the rate of change is lower than the designated threshold, i.e., relatively stable control reference information, so as to more accurately control the running of the terminal device.

In the several embodiments provided in the present invention, it should be understood that the disclosed device and method may be practiced in other manners. The device embodiments described above are merely illustrative. For example, the division of units is merely a division based on logical functions and there may be other ways of division in real practice. For example, multiple units or components may be combined, or may be integrated into another system, or some features can be omitted or not performed. Additionally, coupling, direct coupling, or communication connections among the component parts as shown or discussed may be implemented through some interface(s), and indirect coupling or communication connections of devices or units may be in an electrical, mechanical, or other form.

The units described as separate components may or may not be separated physically. The components illustrated as units may or may not be physical units; that is, they can be either located in one place or distributed over a plurality of network units; the object of the present solution of the embodiments can be achieved by some or all of the units, according to actual requirements.

Furthermore, in various embodiments of the present invention, all of various functional units can be integrated in one processing module, or each unit may function as a single unit, or two or more units may be integrated in one unit; the aforementioned integrated units may be realized by hardware, or by hardware plus software functional unit.

A person skilled in the art should understand that: all or part of the steps to realize the method embodiments described above may be accomplished by relevant hardware via program commands. The aforementioned program may be stored in a readable storage media of one computer. When the program runs, the steps of the method embodiments described above can be implemented; the aforementioned storage media includes various types of media for program code storage, such as mobile storage device, Read-Only Memory (ROM), Random Access Memory (RAM), diskette or compact disc, and the like.

The above are only some specific embodiments of the present invention, and the protection scope of the present disclosure is not limited thereto. Various variations or modifications readily conceived of by those skilled in the art within the technical scope disclosed in the present invention shall fall within the protection scope of the present invention. Accordingly, the protection scope of the present invention is defined by the claims.

What is claimed is:

1. A network device, comprising:
   a first communication component that is configured to connect with a server via a first type of access network and performs an information interaction with the server;
   a second communication component that is connected to the first communication component, that is configured to connect with at least one terminal device, wherein the second communication component is configured to perform an information transfer in relation to current control reference information for a current date with the terminal device; and
   wherein in response to the current control reference information for the current date not being available, the second communication component is configured to perform an information transfer in relation to historical control reference information for a previous date instead.

2. The network device according to claim 1, wherein the network device further comprises:
   a first processing component that is connected to the first and second communication components and that judges whether the connection established by the first communication component with the server via the first type of access network is disconnected;
   a third communication component that is connected to the processing component and that connects to and performs an information interaction with the server via a second type of access network if the connection via the first type of access network is disconnected, wherein the first type of access network and the second type of access network are different types of access networks, and the third communication component and the first communication component are different types of communication components.

3. The network device according to claim 2, wherein the first processing component further determines a first operating strategy according to connection state information of the first and third communication components with the server, selects one of the first and third communication components to perform an information interaction with the server based on the first operating strategy, and controls interaction parameters of the selected communication component performing the information interaction with the server.

4. The network device according to claim 3, wherein:
   the network device further comprises a storage component and a second processing component;
   the storage component stores first control-associated information locally, wherein the first control-associated information comprises a correspondence relationship between first event information and second event information;
   the second communication component receives the first event information sent by a first terminal device;
   if the connection established via the first type of access network is disconnected, the second processing component that is connected to the storage component generates a first control instruction according to the first event information, and generates a second control instruction according to the first control-associated information and the first event information;
   the second communication component sends the first control instruction to the first terminal device and sends the second control instruction to a second terminal device.

5. The network device according to claim 3, wherein a second processing component is connected to the first and second communication components respectively, determines a second operating strategy according to connection state information between the first communication component and the server, and generates a control instruction for controlling the at least one terminal device according to the second operating strategy.

6. The network device according to claim 5, wherein the second processing component controls the first communication component to:
   receive second control-associated information from the server if establishing the connection between the first communication component and the server fails and generate a control instruction that is sent to the at least one terminal device according to the second control-associated information; and
   read the first control-associated information from the storage component if establishing the connection between the first communication component and the server succeeds, and generate a control instruction that is sent to the at least one terminal device according to the first control-associated information.

7. The network device according to claim 6, wherein:
   the storage component stores control reference information; and
   the second processing component further generates a third control instruction according to the control reference information of a specified type, and controls the second communication unit to send the third control instruction to the at least one terminal device, wherein the control reference information of the specified type comprises information that a rate of change of the control reference information is less than a specified threshold.

8. The network device according to claim 1, wherein the information interacted between the at least one network device and the server comprises at least one of the following:
   sending third event information to the server, and receiving fourth event information associated with the third event information returned by the server;

receiving fifth event information generated by the server based on first information sent by a control device; and sending to the server sixth event information generated based on feedback information of the at least one terminal device.

9. The network device according to claim 1, wherein the first communication component is a mobile data communication component that establishes the connection with the server and performs the information interaction with the server via a mobile data access network.

10. A method, comprising:

establishing a connection with a server via a first type of access network;

performing an information transfer in relation to current control reference information for a current date with the server; and wherein in response to the current control reference information for the current date not being available, the second communication component is configured to perform an information transfer in relation to historical control reference information for a previous date instead.

11. The method according to claim 10, wherein the method further comprises:

judging whether the connection established with the server via the first type of access network is disconnected;

establishing a connection to and performing an information interaction with the server via a second type of access network if the connection established via the first type of access network is disconnected, wherein the first type of access network and the second type of access network are different types of access networks.

12. The method according to claim 11, wherein the method further comprises:

determining a first operating strategy according to connection state information of first and third communication components with the server;

selecting a communication component to perform an information interaction with the server based on the first operating strategy; and controlling interaction parameters of the selected communication component performing the information interaction with the server.

13. The method according to claim 11, wherein the method further comprises:

storing first control-associated information locally, wherein the first control-associated information comprises a correspondence relationship between the first event information and second event information;

receiving first event information sent by a first terminal device;

if the connection established via the first type of access network is disconnected, generating a first control instruction according to the first event information and generating a second control instruction according to the first control-associated information and the first event information;

sending the first control instruction to the first terminal device and sending the second control instruction to a second terminal device.

14. The method according to claim 12, wherein the method further comprises:

determining a second operating strategy according to connection state information of the first type of access network and the second type of access network with the server;

selecting one of the first type of access network and the second type of access network to perform an information interaction with the server based on the second operating strategy; and generating a control instruction for controlling the at least one terminal device according to the second operating strategy.

15. The method according to claim 14, wherein the method further comprises:

receiving second control-associated information from the server if establishing the connection between the first communication component and the server fails;

generating and sending a control instruction to the at least one terminal device according to the second control-associated information;

reading the first control-associated information from a storage component if establishing the connection between the first communication component and the server succeeds;

generating and sending a control instruction to the at least one terminal device according to the first control-associated information.

16. The method according to claim 10, wherein the method further comprises:

storing control reference information locally;

generating a third control instruction according to the control reference information of a specified type; and sending the third control instruction to the at least one terminal device, wherein the control reference information of the specified type comprises information that a rate of change of the control reference information is less than a specified threshold.

17. The method according to claim 10, wherein the information interacted between the at least one network device and the server comprises at least one of the following:

sending third event information to the server, and receiving fourth event information associated with the third event information returned by the server;

receiving fifth event information generated by the server based on first information sent by a control device; and sending to the server sixth event information generated based on feedback information of the at least one terminal device.

18. The method according to claim 10, wherein performing an information interaction with the at least one terminal device sending information based on an interaction with the server comprises at least one of the following:

if establishing a connection with the server via the first type of access network fails, generating a control instruction sent to the at least one terminal device according to the first control-associated information;

if establishing a connection with the server via the first type of access network succeeds, receiving second control-associated information from the server, and generating a control instruction sent to the at least one terminal device according to the second control-associated information.

19. The method according to claim 10, wherein:

the first type of access network is a mobile data access network; and establishing the connection and performing the information interaction with the server is via the mobile data access network.

20. A program product comprising a non-transitory computer readable storage medium that stores code executable by a processor to:

establish a connection with a server via a first type of access network;
perform an information transfer in relation to current control reference information for a current date with the server;
wherein in response to the current control reference information for the current date not being available, the second communication component is configured to perform an information transfer in relation to historical control reference information for a previous date instead.

* * * * *